United States Patent [19]
Kunitake et al.

[11] Patent Number: 5,459,517
[45] Date of Patent: Oct. 17, 1995

[54] MOVING PICTURE SCENE DETECTION SYSTEM

[75] Inventors: Setsu Kunitake; Koh Kamizawa, both of Kanagawa, Japan

[73] Assignee: Fuji Xerox Co., Ltd., Tokyo, Japan

[21] Appl. No.: 166,047

[22] Filed: Dec. 14, 1993

[30] Foreign Application Priority Data

Dec. 15, 1992 [JP] Japan .................................. 4-334746
Mar. 18, 1993 [JP] Japan .................................. 5-059079

[51] Int. Cl.$^6$ ..................................................... H04N 7/32
[52] U.S. Cl. ............................................ 348/416; 348/700
[58] Field of Search ............................ 348/150, 700, 348/701, 416, 579, 409; 358/311; 360/14.1, 14.2, 14.3; H04N 7/137

[56] References Cited

U.S. PATENT DOCUMENTS

| | | | |
|---|---|---|---|
| 4,168,510 | 9/1979 | Kaiser ..................................... | 348/579 |
| 4,179,704 | 12/1979 | Moore et al. ........................... | 348/579 |
| 4,214,263 | 7/1980 | Kaiser ..................................... | 348/579 |
| 4,237,483 | 12/1980 | Clever .................................... | 348/150 |
| 4,893,182 | 1/1990 | Gautraud et al. ...................... | 348/579 |
| 4,918,530 | 4/1990 | Barton et al. .......................... | 348/579 |
| 5,032,905 | 7/1991 | Koga ....................................... | 348/700 |
| 5,179,449 | 1/1993 | Doi .......................................... | 358/311 |
| 5,181,111 | 1/1993 | Hedley et al. .......................... | 348/701 |
| 5,182,677 | 1/1993 | Kizu et al. .............................. | 360/14.2 |
| 5,253,065 | 10/1993 | Richards et al. ....................... | 348/579 |
| 5,267,334 | 11/1993 | Normille et al. ....................... | 348/409 |

FOREIGN PATENT DOCUMENTS 4-219878  8/1992  Japan .

OTHER PUBLICATIONS

"An interactive motion picture editing", Ueda, H., The Institute of Electronics, Information and Communication Engineers, Technical Report, vol. IE90–6, pp. 39–46, 1990. (Abstract only English translation).
"Automatic scene–change detection method for video works", Nagasaka et al., Information Processing Society of Japan, 40th (Heisei 2, first half period) National Convention Papers,1Q–5, pp. 642–643, 1990. (no translation).
"A Study on video retrieval using interframe coded data", Haseyama et al., The Institute of Electronics, Information and Communication Engineers, 1992 Spring Convention Papers, D–292, pp. 7–34, 1992. (no translation).

Primary Examiner—Tommy P. Chin
Assistant Examiner—Richard Lee
Attorney, Agent, or Firm—Finnegan, Henderson, Farabow, Garrett & Dunner

[57] ABSTRACT

A moving picture scene detection system for detecting a distinctive scene from moving picture data. In the system, the attribute data of the coded data stored in a data storing unit is decoded by a attribute data decoding unit, to produce the decoded attribute data. A distinctive candidate scene in the moving pictures is detected by a candidate scene detecting unit on the basis of the decoded attribute data. The candidate scene and the image data for several frames preceding and subsequent to the candidate scene are decoded by an image data decoding unit, and displayed by an image data display unit. The type of the candidate scene and the position thereof in the moving pictures are stored in the data storing unit as edit data.

14 Claims, 9 Drawing Sheets

MOVING PICTURE SCENE DETECTION SYSTEM

BACKGROUND OF THE INVENTION

1. Field of the Invention

The present invention relates to a moving picture scene detection system for detecting a distinctive scene from moving picture data recorded in a digital recording medium in a compressed form, and for recording the detected scene into the same.

2. Discussion of the Related Art

In editing moving pictures of the cinema or the television, desired scenes are cut out of a sequence of consecutive pictures of films or video tapes and are arranged and connected as intended.

The edit work of editing moving pictures basically consists of the following three procedural steps.

1) To search and pick up desired scenes from among a series of pictures.

2) To cut out these scenes.

3) To arrange and connect the cut-out scenes in an intended sequence.

Of these three steps, step 1) most impedes the edit work for the following reasons.

a) The work to search and pick up the desired scenes is based on the visual inspection. Because of this, much time is consumed for this work.

b) The editor must be highly skilled for the search/pickup work.

Recently, the moving picture coding technique has remarkably advanced. For example, an MPEG (motion picture expert group) coding technique as one of the candidates for the international standards for stored moving picture coding enables the moving pictures for approximately one hour to be recorded in a single CD-ROM. In this situation, new technical problems will arise. For example, economical image data recording media must be produced. A great amount of visual information must be handled. The efficiency of the scene retrieval work of step 1) must be improved.

With the above background, the systems for automatically retrieving desired scenes have been studied and proposed.

For example, Audio has proposed a scene retrieval method based on quantities of features of images in his paper entitled "An interactive motion picture editing", The Institute of Electronics, Information and Communication Engineers, Technical Report, Vol. IE90-6, 1990.

Nagasaka and Tanaka has proposed a method of detecting scene changes in which the scenes of markedly low correlation between the frames are recognized as scene changes, in their paper entitled "Automatic scene-change detection method for video works", Information Processing Society of Japan, 40th (Heisei 2, first half period) National Convention Papers, 1Q-5, pp. 642 to 643, 1990.

Japanese Patent Unexamined Publication No. Hei. 4-219878 discloses a unique scene change detection support technique which uses the magnitude of difference data between the present and preceding frames for scene change detection. This support technique is realized by the arrangement shown in FIG. 13, which includes a scene change check section 801, a moving picture data section 802, an attribute data decoding section 803, a data expanding section 804, and a display section 805. Moving picture data and attribute data, such as data quantity and frame positions, are stored every frame in the moving picture data section 802, in the format as shown in FIG. 14. Let us consider a case where the moving picture data section 802 stores the difference data between the preceding and the present frames as the moving picture data, and the code quantity of each frame and the frame position as the attribute data. In this case, the candidates for scene changes can be detected by comparing the code quantity with a threshold value. The frame of a large code quantity (the quantity of difference data between the preceding and the present frames) indicates such a frame of which the data quantity is greatly different from that of the preceding frame. This fact indicates that a scene change highly probably occurs in this field. The frame in which an moving picture occupies a large area has also a large difference data quantity. The threshold process of the code quantity mistakenly detects this frame as the scene of the scene change. In this respect, the threshold process of the code quantity is not versatile.

Haseyama, Tanaka, and Ohba have proposed a method for retrieving, by using the code quantity of each frame, desired scenes of the moving picture data coded by the interframe predictive DCT coding technique, in their paper entitled "A Study on video retrieval using interframe coded data", The Institute of Electronics, Information and Communication Engineers, 1992 Spring Convention Papers, D-292.

When moving pictures are edited or intended scenes are retrieved from the moving pictures, the whole moving picture data must be played back (or fast fed). The playback of the whole moving picture data consumes much time and makes it impossible to concurrently carry out the edit or the scene retrieval work by using a plurality of pieces of moving picture data. To store the moving picture data not coded, a large memory capacity is required for the memory used. If the moving picture data after coded is stored, another problem arises. To retrieve desired scenes from the stored, coded moving picture data, the whole moving picture data must be decoded. This decoding work consumes much time.

The proposal by Audio in his paper entitled "An interactive motion picture editing", The Institute of Electronics, Information and Communication Engineers, Technical Report, Vol. IE90-6, 1990, and the proposal by Nagasaka and Tanaka in their paper entitled "Automatic scene-change detection method for video works", Information Processing Society of Japan, 40th (Heisei 2, first half period) National Convention Papers, 1Q-5, pp. 642 to 643, 1990, handle the moving picture data not coded. Accordingly, the image data processing systems based on those proposals must have high data processing capabilities. The memory devices used must have large memory capacity.

The technique disclosed in Japanese Patent Unexamined Publication No. Hei. 4-219878, simply checks as to whether or not Data>Th (Data: quantity mount of difference data between the adjacent frames, and Th: threshold value) by the scene change check section 801. Accordingly, the technique is able to detect only one type of scene change. Further, the technique does not record the detected scenes. Therefore, the user must detect the scenes every editing work.

The proposal by Haseyama, Tanaka, and Ohba in their paper entitled "A Study on video retrieval using interframe coded data", The Institute of Electronics, Information and Communication Engineers, 1992 Spring Convention Papers, D-292, retrieves the scenes on the basis of only the code quantity of each frame. In the coding method where the code quantity is controlled so as to keep the quantity of the generated data constant, this proposal cannot provide a high accurate scene detection.

SUMMARY OF THE INVENTION

The present invention has been made in view of the above circumstances and has an object to provide a moving picture scene detection system which can decode only attribute data of the moving picture data coded and recorded, and detect candidates for distinctive scenes by using the attribute data.

Another object of the invention is to provide a moving picture scene detection system which can detect a scene change at a high accuracy in accordance with various statistical quantities gained from the attribute data.

To achieve the above objects, the invention provides a moving picture scene detection system including data storing means for storing coded data including moving picture data proper as coded moving picture data and attribute data indicative of the attribute of the moving picture data proper, attribute data decoding means for decoding the attribute data of the coded data, candidate scene detecting means for detecting a candidate for a distinctive scene in moving pictures by using attribute data output from the attribute data decoding means, image data decoding means for decoding the image data of the coded data, and image data display means for displaying the decoded image data output from the image data decoding means.

Further, the invention provides a moving picture scene detection system including data storing means for storing coded data including moving picture data proper as coded moving picture data and attribute data indicative of the attribute of the moving picture data proper, and edit data of the coded data, attribute data decoding means for decoding the attribute data of the coded data, candidate scene detecting means for detecting a candidate for a distinctive scene in moving pictures by using attribute data output from the attribute data decoding means, image data decoding means for decoding the image data of the coded data, and image data display means for displaying the decoded image data output from the image data decoding means, the edit data to be stored in the data storing means being the data of the candidate scene detected by the candidate scene detecting means.

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention. In the drawings.

DETAILED DESCRIPTION OF THE PREFERRED EMBODIMENTS

Figure 1:
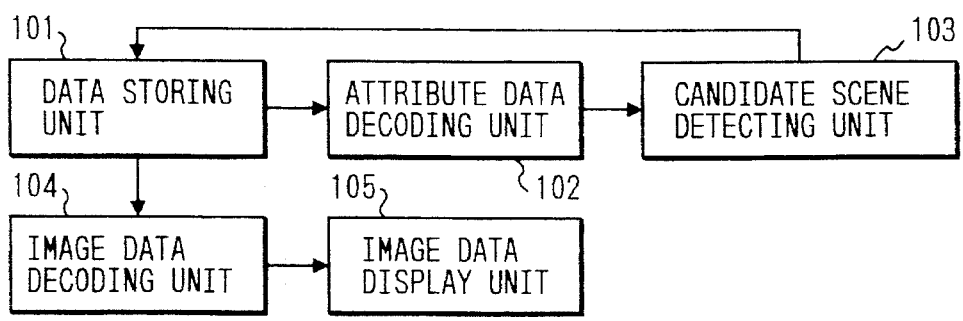
FIG. 1 is a block diagram showing the concept of the present invention.

The basic construction of a moving picture scene detection system of the invention, as shown in FIG. 1, includes: a data storing unit 101 for storing coded data including coded moving picture data and attribute data, and edit data; an attribute data decoding unit 102 for decoding the attribute data of the coded data that is stored in the data storing unit 101; a candidate scene detecting unit 103 for detecting candidates for distinctive scenes of the moving pictures by using attribute data output from the attribute data decoding unit 102; an image data decoding unit 104 for decoding the image data of the coded data that is stored in the data storing unit 101; and an image data display unit 105 for displaying the decoded image data output from the image data decoding unit 104.

With such an arrangement, only the attribute data is read out for each frame from the data storing unit 101, decoded by the attribute data decoding unit 102, and input to the candidate scene detecting unit 103. The candidate scene detecting unit 103 detects a candidate for a distinctive scene in the moving pictures by using the decoded attribute data output from the attribute data decoding unit 102. This candidate will be referred to as a candidate scene. Every time the candidate scene is detected, the detected candidate scene and the image data of several frames proceeding and succeeding to the frame of the detected candidate scene are read out of the data storing unit 101, and are decoded by the image data decoding unit 104. Finally, those image data are displayed in the form of a side-by-side arrangement by the image data display unit 105. A user comparatively sees the thus arranged image data displayed by the image data display unit 105, recognizes the type of the detected candidate scene, and categorizes the type of the candidate scene and the frame position as the edit data of the coded data into the data storing unit 101. At this time, the user determines the type of the scene. Accordingly, the type of the scene is not limited to one type. The sequence of the above operations is repeatedly applied for the whole moving picture data. The types of the distinctive scenes and the edit data as the position data, together with the moving picture data, are stored into the data storing unit 101. Since the moving picture scene detection system is thus arranged and operated, the user can efficiently carry out his edit work without any interruption by the repetitive retrieval of intended scenes.

Figure 2:
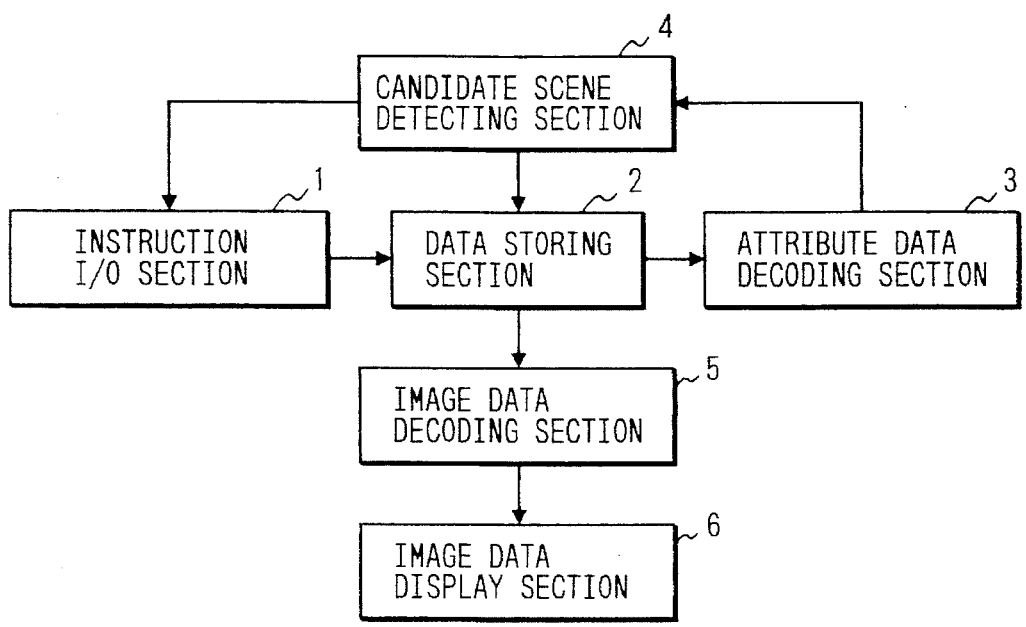
FIG. 2 is a block diagram showing the arrangement of a moving picture scene detection system according to an embodiment of the present invention.
Figure 5:
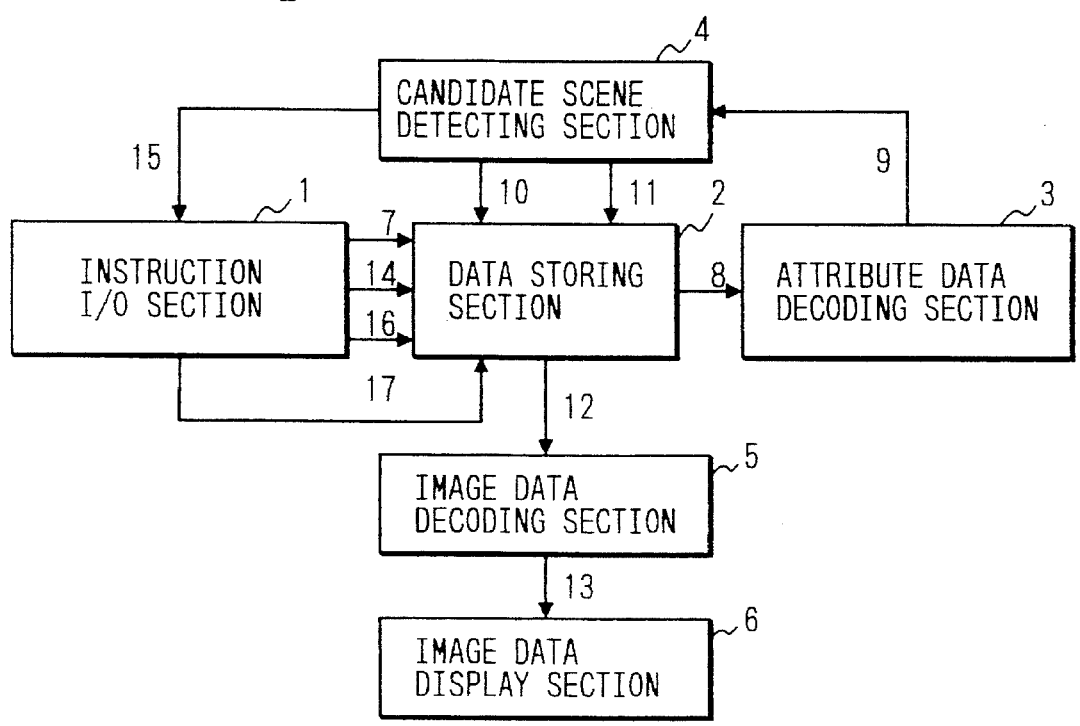
FIG. 5 is a block diagram showing signal flows in the moving picture scene detection system of FIG. 2.

FIG. 2 is a block diagram showing the arrangement of a moving picture scene detection system according to an embodiment of the present invention. FIG. 5 is a block diagram showing signal flows in the moving picture scene detection system of FIG. 2.

In FIG. 2, reference numeral 1 designates an instruction I/O (input/output) section; 2, a data storing section; 3, an attribute data decoding section; 4, a candidate scene detecting section; 5, an image data decoding section; and 6, an image data display section. In FIG. 5, reference numeral 7 designates a detection/record start signal generated when a user instructs the start of a detection/record operation. An attribute data signal 8 is read out of the data storing section 2. A decoded attribute data signal 9 is output from the attribute data decoding section 3. A frame attribute data readout signal 10 is used for instructing the readout of the attribute data from the data storing section 2. A specified frame image display signal 11 is used for instructing display of the image data of the frame detected by the candidate scene detecting section 4. A sequential image data signal 12 is specified by the specified frame image display signal 11 and read out of the data storing section 2. A decoded image data signal 13 is output from the image data decoding section 5. A record/readout restart signal 14 instructs the record of the edit data and the restart of reading out the attribute data. A last frame signal 15 indicates that a detected candidate scene is that of the last frame. A record/detection end signal 16 instructs the record of the edit data, and the end of the scene detection process. A detection end signal 17 instructs only the end of the scene detection process.

Figure 3:
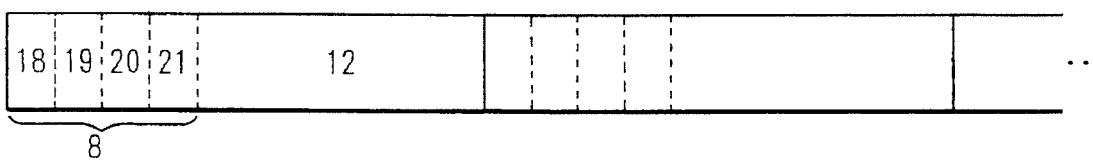
FIG. 3 is a diagram showing the format of coded data handled in the moving picture scene detection system of FIG. 2.
Figure 4:
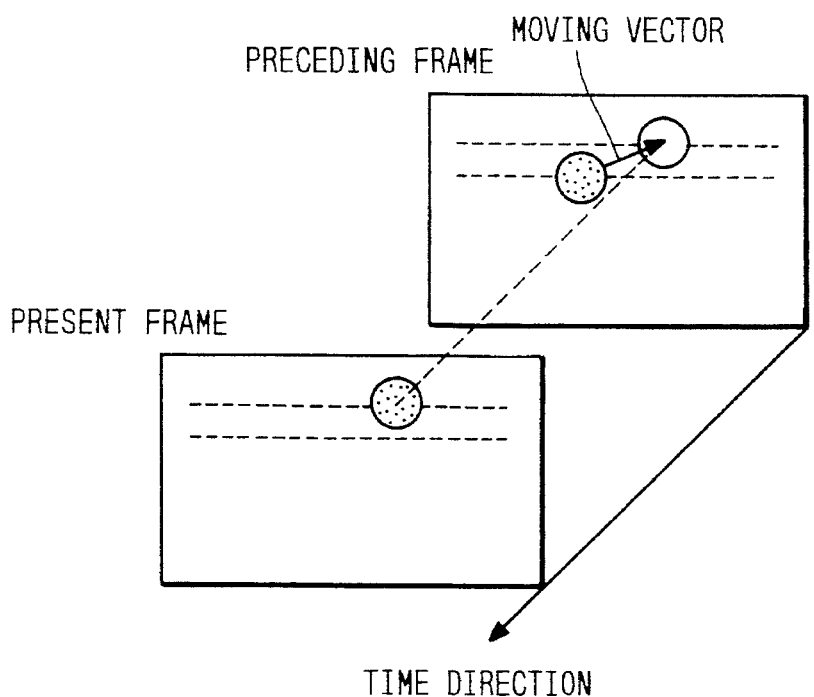
FIG. 4 is a diagram showing the principle of a motion compensation coding.

FIG. 3 is a diagram showing the format of coded data handled in the moving picture scene detection system of FIG. 2. The coded data shown in FIG. 3 is formed by coding the moving picture data by a motion compensation interframe/intraframe adaptive prediction coding method. In FIG. 3, reference numeral 18 designates a frame position code; 19, an interframe/intraframe code indicating which of the interframe coding method and the intraframe coding method is used; 20, a data amount code representing an amount of data of the frame; and 21, an number-of-vectors code representative of the number of nonzero motion compensation vectors within the frame. The motion compensation interframe/intraframe adaptive prediction coding method is a coding method in which the interframe coding for coding the difference data between the present frame and the preceding frame or the intraframe coding for coding the data of the frame to be coded is adaptively used. For the frame having a large amount of difference data, the intraframe coding method is used. In order to lessen the image quality deterioration owing to the accumulation of coding error and for ease of the decoding, the intraframe coding is forcibly applied at fixed periods, that is, a called periodical refresh is performed. The principle of the motion compensation coding technique is illustrated in FIG. 4. In this coding technique, in calculating the data difference between the present frame and the preceding frame, a motion of an object is considered, that is, a motion vector is detected. The position of the object in the preceding frame is shifted on the basis of the motion vector, thereby to minimize the difference data between the present frame and the preceding frame. In the background and image areas of still objects, the motion vector is zero. The larger the image area of a moving object is, the larger the number of motion vectors of nonzero within the frame is. In the case of moving pictures taken by the panning, zooming, or another technique, it can be considered that the motion vectors of nonzero are present in most of the image area of the moving picture.

Figure 6:
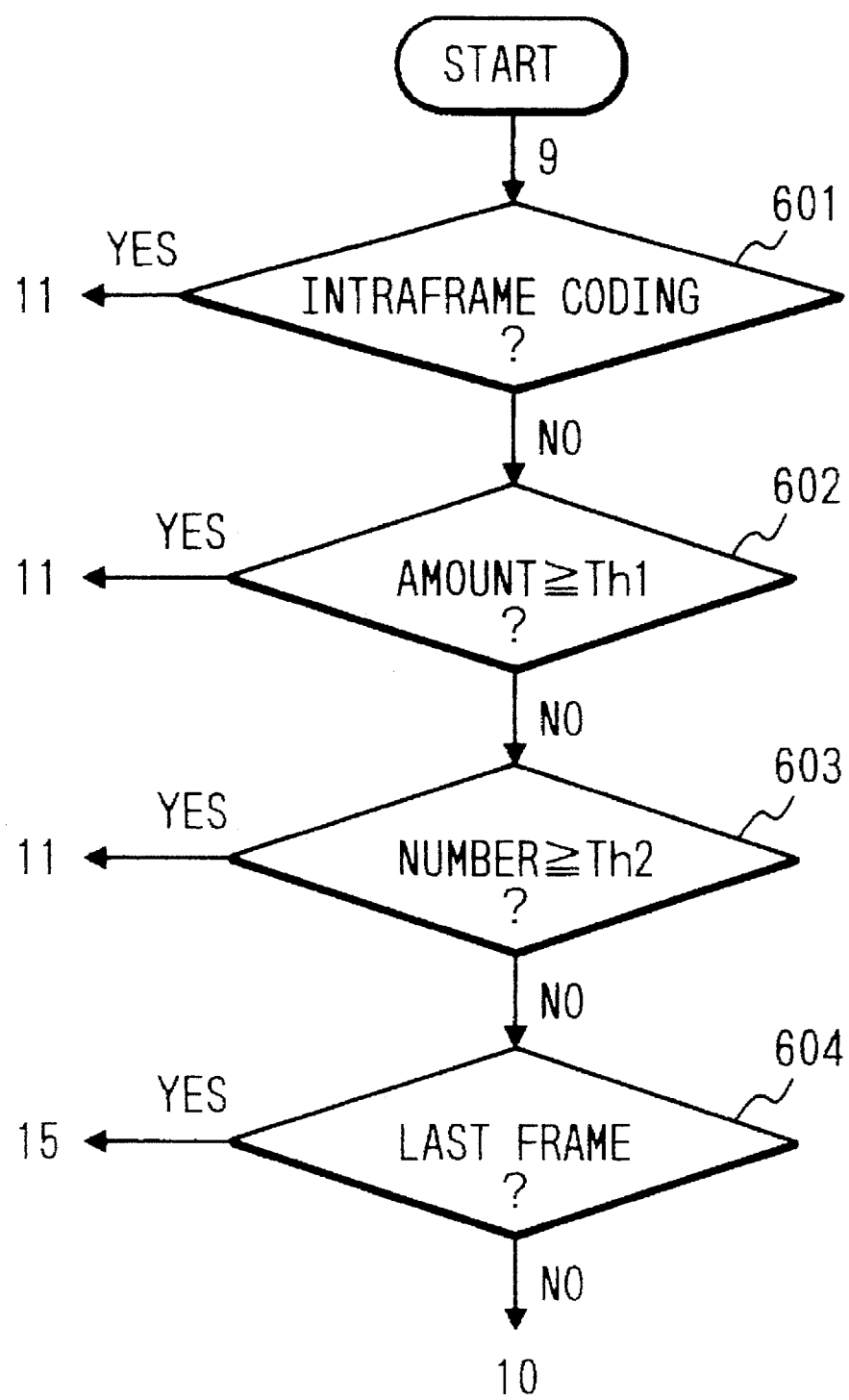
FIG. 6 is a flow chart showing a flow of the process by a candidate scene detecting section in the FIG. 2 system.

The operation of the moving picture scene detection system thus arranged will be described. In FIG. 5, a user enters an instruction to start the detection/record and the name of image data from the instruction I/O section 1. Then, the section 1 sends the detection/record start signal 7 to the data storing section 2. The attribute data of the first frame of the specified image data is read out of the data storing section 2, and is transferred in the form of the attribute data signal 8 to the attribute data decoding section 3. The attribute data is decoded by the attribute data decoding section 3, and is transferred, in the form of the decoded attribute data signal 9, to the candidate scene detecting section 4. A flow of the process carried out in the candidate scene detecting section 4 is shown in FIG. 6.

When receiving the decoded attribute data signal 9, the candidate scene detecting section 4 examines the decoding result of the interframe/intraframe code 19. In this embodiment, the result of decoding the interframe/intraframe code 19 is expressed by "Inter_Intra". When Inter_Intra=0, the interframe coding is used. When Inter_Intra=1, the intraframe coding is used. The decoding result of Inter_Intra =1 indicates that the data difference between the present and preceding frames is great, if the present frame is not one being periodically refreshed. Therefore, the scene of the present frame will be a distinctive scene of a scene change, an object appearance, or the like, highly probably. Accordingly, the candidate scene detecting section 4 transfers to the data storing section 2, the specified frame image display signal 11 based on the result of decoding the frame position code. When Inter_Intra=0 and the present frame is one being periodically refreshed, the following process is carried out (step 601).

The candidate scene detecting section 4 examines the result (expressed as "amount") of decoding the data amount code 20 of the decoded attribute data signal 9. If amount≧Th1 (where Th1 is a preset threshold value), the amount of data of the present frame is greatly changed from that of the preceding frame. This fact indicates that the scene of the present frame will be a distinctive scene of a scene change, an object appearance, or the like, highly probably. Accordingly, the candidate scene detecting section 4 transfers to the data storing section 2, the specified frame image display signal 11 based on the result of decoding the frame position code. If amount<Th1, the following process is executed (step 602).

Thereafter, the candidate scene detecting section 4 examines the result (expressed as "Number") of decoding the number-of-vectors code 21 of the decode attribute data signal 9. If Number≧Th2 (where Th2 is a preset threshold value), the scene of the present frame will probably be a distinctive scene, such as panning. Accordingly, the candidate scene detecting section 4 transfers to the data storing section 2, the specified frame image display signal 11 based on the result of decoding the frame position code. If Number<Th2, the following process is executed (step 603).

Finally, the candidate scene detecting section 4 checks as to whether the frame under processing is the last frame or not. If it is the last frame, the candidate scene detecting section 4 sends the last frame signal 15 to the instruction I/O section 1. If it is not the last frame, the candidate scene detecting section 4 sends the frame attribute data readout signal 10 to the data storing section 2 (step 604).

In FIG. 5, when the frame attribute data readout signal 10 is transferred to the data storing section 2, the attribute data signal 8 is applied to the attribute data decoding section 3, and the decode attribute data signal 9 is applied from the attribute data decoding section 3 to the candidate scene detecting section 4, in order that the frame subsequent to the last frame from which the attribute data is read, is processed in a like manner. In this way, the scene detection operation is continued.

When the specified frame image display signal 11 is applied from the candidate scene detecting section 4 to the data storing section 2, the specified frame and several frames preceding and subsequent to the specified one (the number of these frames is set previously) are transferred, as sequential image data signals 12, to the image data decoding section 5. The sequential image data signals 12 are sequentially decoded by the image data decoding section 5. The decoded image data are transferred as decoded image data signals 13 to the image data display section 6. The display section 6 displays the decoded image data 13 arranged side by side in the incoming order. To decode the frame coded by the interframe coding technique, the decoding operation must starts from the frame coded by the intraframe coding technique, because only the difference data between the present frame and the preceding frame is coded, in the case of the intraframe coded frame.

Figure 7:
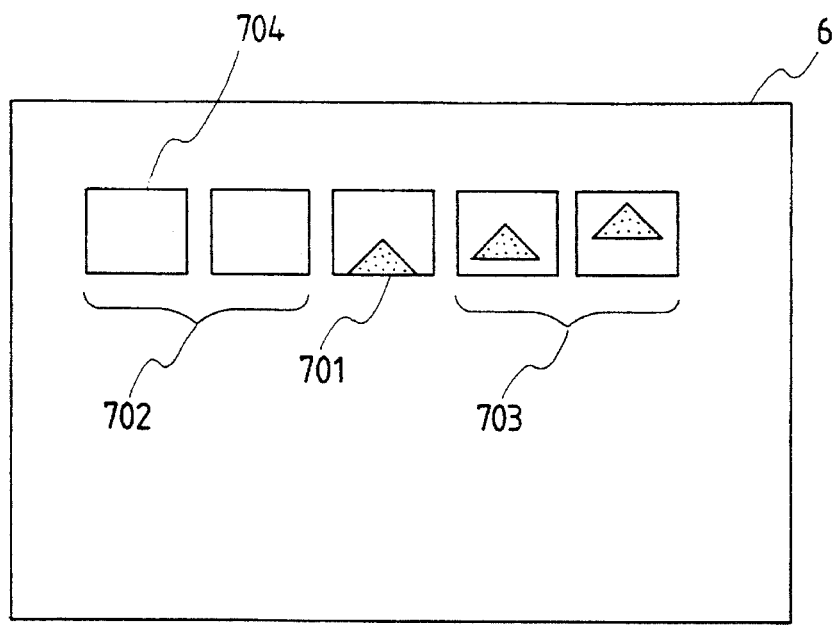
FIG. 7 is a diagram showing an example of the display of scenes by an image data display section of the FIG. 2 system.

An example of the display of scenes by the image data display section 6 is shown in FIG. 7. In the figure, reference numeral 701 designates a candidate scene detected; 702, specified images preceding to the candidate scene 701; 703, specified images succeeding to the candidate scene 701; and 704, an image located at the second place preceding to the candidate scene 701 in the frames coded by the intraframe coding technique.

For discriminating the type of the desired scene, the user examines the images of those several frames with respect to the candidate scene, that are displayed on the screen of the image data display section 6. When the frame of the scene now displayed does not yet reach the last frame, the user enters from the instruction I/O section 1, an instruction to restart the detection process and the record of the type of the scene and the frame position. In response to the instruction, the record/readout restart signal 14 is transferred to the data storing section 2, and the detection processing is restarted after the edit data is recorded. When the frame of the scene now displayed has reached the last frame, the user instructs the system to record the edit data and to end the processing through the instruction I/O section 1. Upon the instructions, the record/detection end signal 16 is transferred to the data storing section 2, and the system carries out a post process, such as a file closing process.

When the last frame signal 15 is transferred to the instruction I/O section 1 in step 604, a message, which requests the user to enter a process end instruction, is displayed. After seeing the message, the user instructs the system to end the detection process. In response to the instruction, the detection end signal 17 is transferred to the data storing section 2, and the system carries out a post process, such as a file closing process.

Figure 8:
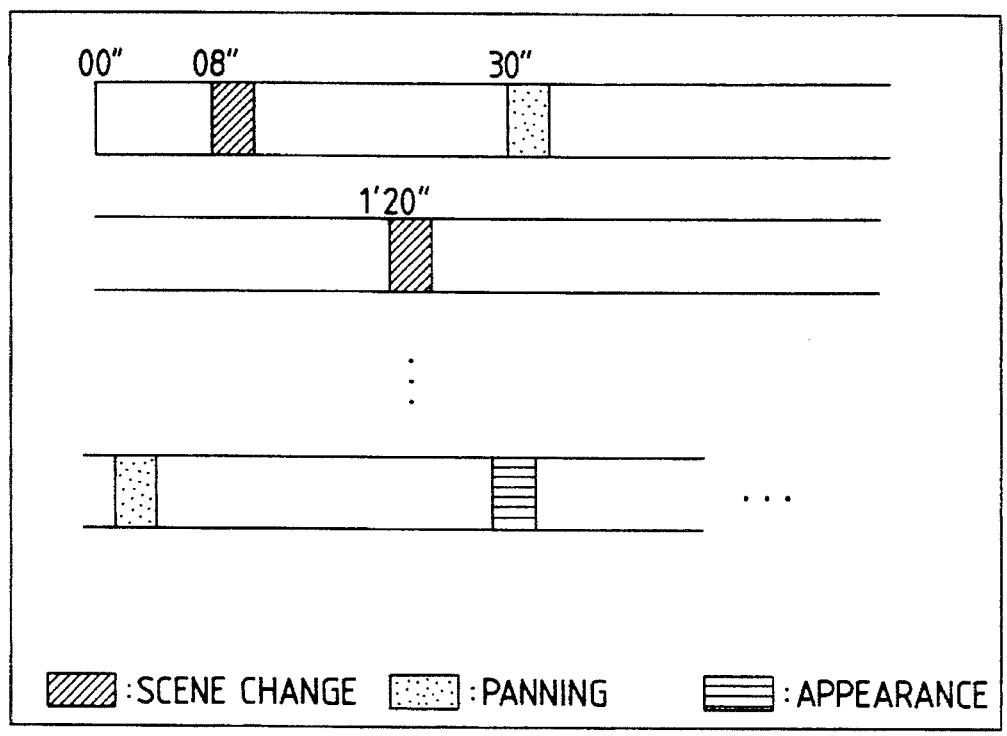
FIG. 8 is a diagram showing an example of visual representation of edit data, which enables the user to visually grasp the locations and the types of distinctive scenes in the moving pictures.

After the detection/discrimination, the edit data may be visualized as shown in FIG. 8, using the edit data stored in the data storing section 2. With the display illustrated, the user can distinctly grasp the positions and the types of the distinctive scenes of the moving picture data. In the example of FIG. 8, only the data on the distinctive scene of the moving picture data is displayed. As shown, a scene change occurs at a time point of 08 seconds, a panning occurs at a time point of 30 seconds, and another scene change occurs at a time point of one minute and 20 seconds.

Next, another embodiment of the invention will be described.

First, a moving picture coding system for generating coded image data of which the scene changes are detected by the moving picture scene detection system of the invention will be described with reference to FIG. 9. The moving picture coding system of FIG. 9 employs a coding method as the combination of "interframe predictive coding method" and "DCT (discrete cosine transform) coding method".

In the moving picture coding system, a block extraction circuit 30 extracts an image block of the present frame from input image data (the image data of the present frame). The image block consists of a preset number of pixels. The extracted image block is transferred to a subtractor 31. The subtractor 31 subtracts the image block of the preceding frame from the image block of the present frame. The difference image block is supplied through a discrete cosine transform (DCT) circuit 32 to a quantizing circuit 33. The circuit 33 produces a quantizing index of a transform coefficient (referred to as transform coefficient data). The transform coefficient data is supplied to a variable length coding unit 34 where it is variable length coded. The transform coefficient data derived from the quantizing circuit 33 is transferred through an inverse quantizing circuit 35 to an inverse discrete cosine transform (IDCT) circuit 36 where the difference image block is reproduced. The difference image block is supplied through an adder 37 to a frame memory 38. The output data signal, or the image block of the preceding frame, from the frame memory 38 is supplied to the subtractor 31 and the adder 37. The construction of the moving picture coding system thus far described is the same as that of a general moving picture coding system.

Figure 9:
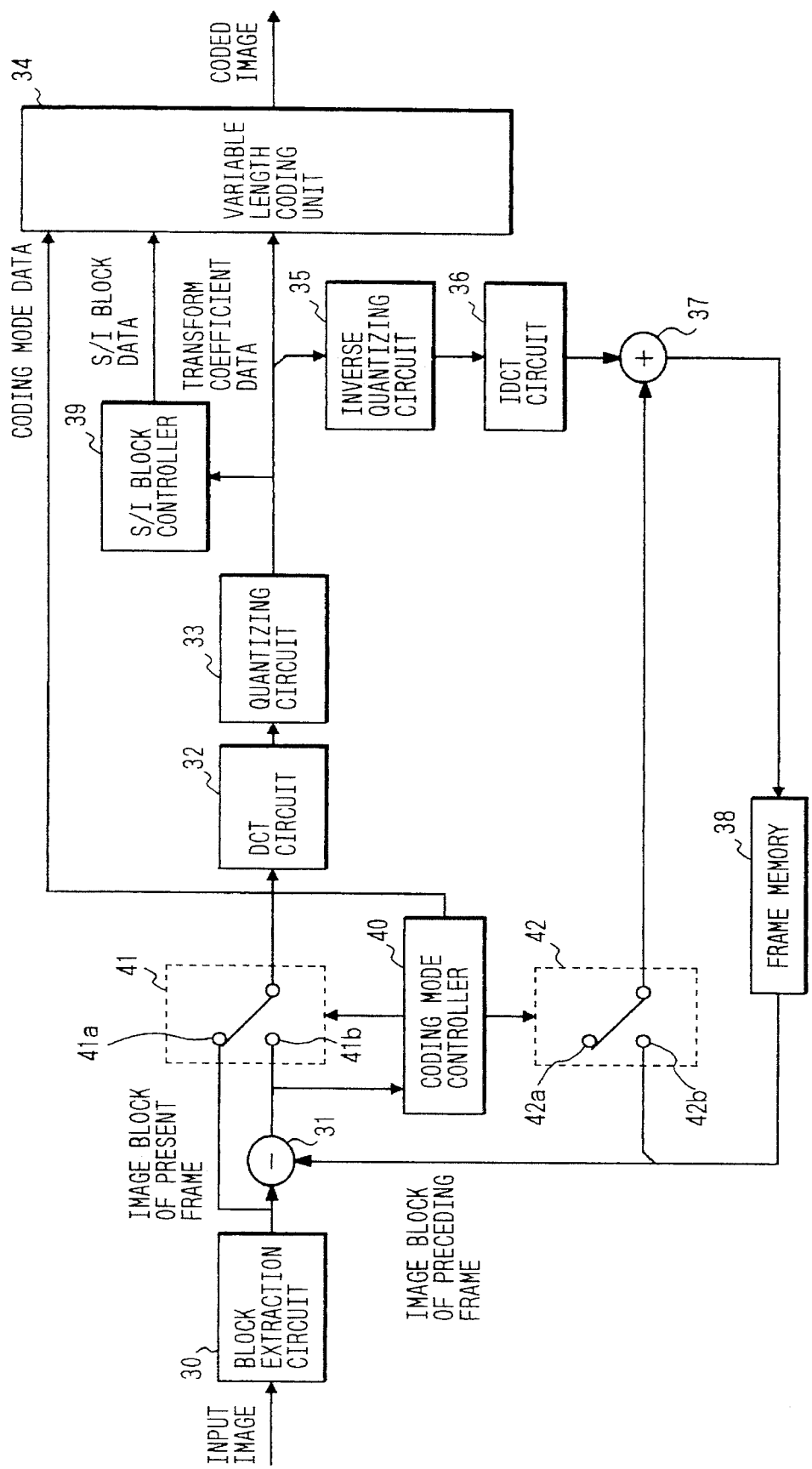
FIG. 9 is a block diagram showing a moving picture coding system for generating coded image data of which the specific scenes are to be detected.

In the moving picture coding system of FIG. 9, the difference image block derived from the subtractor 31 is transferred to a coding mode controller 40, and the transform coefficient data derived from the quantizing circuit 33 is transferred to a significant/insignificant (S/I) block controller 39.

The coding mode controller 40, when receiving the image block of considerably large difference, selects an intraframe coding mode since the interframe coding method improperly functions for such difference image block. When receiving other difference image blocks, the coding mode controller 40 selects an interframe predictive coding mode. A signal representative of the mode selection by the coding mode controller 40 is applied as a coding mode data signal to first and second switches 41 and 42, and a variable length coding unit 34.

When the coding mode data from the coding mode controller 40 is the intraframe coding mode, a movable contact of the first switch circuit 41 is turned to a fixed contact 41a, so that the image block of the present frame is supplied to the DCT circuit 32. When the coding mode data from the coding mode controller 40 is the interframe predictive coding mode, the movable contact of the first switch circuit 41 is turned to a fixed contact 41b, so that the difference image block is supplied to the DCT circuit 32.

When the coding mode data from the coding mode controller 40 is the intraframe coding mode, a movable contact of the second switch circuit 42 is turned to a fixed contact ah, so that the "zero block" of which the values are all zeros is supplied to the adder 37. When the coding mode data is the interframe predictive coding mode, the movable contact of the second switch circuit 42 is turned to a fixed contact ad, so that the output data (image data of the preceding frame) is applied to the adder 37, from the frame memory 38.

When the coding mode data from the coding mode controller 40 is the intraframe coding mode, the S/I block controller 39 determines the image block of the type in which the transform coefficient data from the quantizing circuit 33 is substantially zero, as an insignificant block, and determines other types of blocks as significant blocks. The result of the determination is supplied as S/I (significant/insignificant) block data to the variable length coding unit 34.

The variable length coding unit 34 variable-length codes the S/I block data from the S/I block controller 39, the coding mode data from the coding mode controller 40, and the transform coefficient data from the quantizing circuit 33, thereby generating coded image data. The coded image data signal is transferred through a transmission line to an image decoding device or stored into a memory device. When the S/I block data from the S/I block controller 39 is an insignificant block, the transform coefficient data from the quantizing circuit 33 is not variable-length coded. When the insignificant block is decoded, it is supplemented with the corresponding block of the preceding frame. In this case, the S/I block data and the coding mode data belong to the attribute data of the coded moving picture data.

Next, how the scene change is detected using the attribute data used in the moving picture coding system will be described.

The feature of the image can be preestimated on the basis of the attribute data to a certain degree of accuracy, as will be described below. The significant block is an image block of which the data quantity is greatly changed from that of the preceding block. Accordingly, the significant block is usually a moving picture area in the frame. The frame in which the number of significant blocks is noticeably large is not a mere moving picture area but is probably the frame of a scene change.

The intraframe coding mode is selected when the significant block whose data quantity change from the preceding frame is markedly great, is coded. Therefore, the frame in which the ratio of the intraframe coding significant blocks to other significant blocks is remarkably large will be highly probably the frame of a scene change.

The present invention detects a scene change on the basis of the correlation between the attribute data and the scene change.

Figure 10:
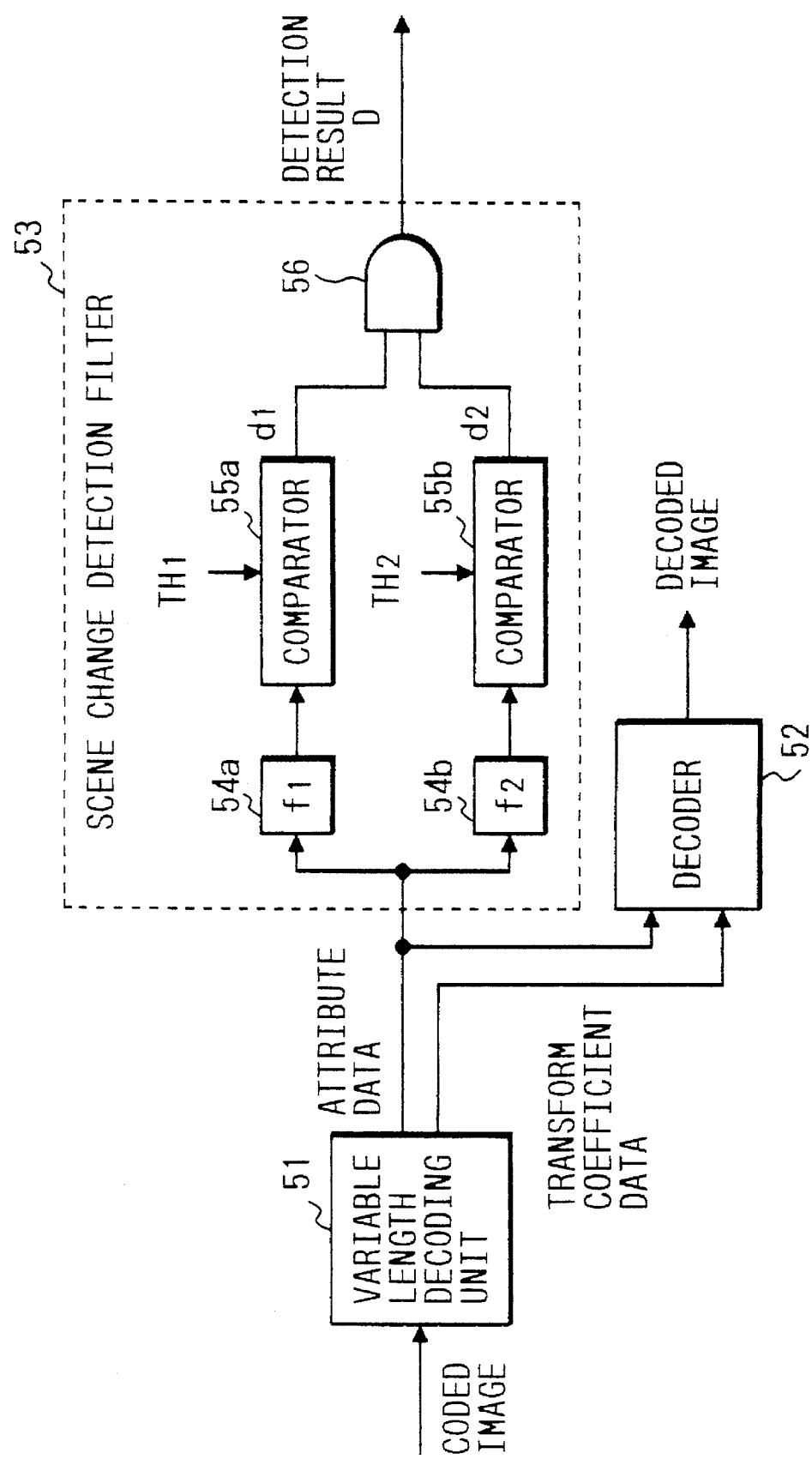
FIG. 10 is a block diagram showing another embodiment of the moving picture scene detection system according to the present invention.

FIG. 10 is a block diagram showing another embodiment of the moving picture scene detection system according to the present invention.

Variable length coded image data, coming through a transmission line or read out of the memory device, is decoded by a variable length decoding unit 51. The variable length decoding unit 51 produces transform coefficient data and attribute data (S/I block data and coded mode data). The S/I block data and coded mode data are supplied to a decoder 52 which in turn produces decoded image data signals. The attribute data is also supplied to a scene change detection filter 53. The attribute data are really the S/I block data and the coding mode data, that are referred to in connection with FIG. 9 showing the moving picture coding system.

The scene change detection filter 53 includes two statistical quantity calculators 54a and 54b, which receive the attribute data, comparators 55a and 55b for comparing the output signals of the calculators 54a and 54b respectively with threshold values $TH_1$ and $TH_2$, and an AND gate 56 for ANDing the output data signals of the comparators 55a and 55b.

The statistical quantity calculators 54a and 54b are used for calculating the number of significant blocks as statistical quantities. The comparators 55a and 55b are used for obtaining the ratio of the intraframe coding significant blocks to other significant blocks as statistical quantities.

The characteristic of the scene change detection filter 53 is expressed by the following formula.

$$D = d_1 \cdot d_2$$

$$d_1 = \begin{cases} 1 \text{ (detection)} : f_i(c(n)) > TH_i \\ 0 \text{ (nondetection)} : f_i(c(n)) \leq TH_i \end{cases}$$

where
D: Result of scene change detection
$d_1$: Check result on the statistical quantity $f_i$
$f_i$: i-th statistical quantity function
c(n): Block characteristic data on the n-th frame
$TH_i$: Threshold value on the i-th statistical quantity The scene change detection filter 53 shown in FIG. 10, which has the characteristic as just mentioned, produces an output signal representative of a scene change detection if the number of the significant blocks in the frame is larger than the threshold value $TH_1$ and the ratio of the intraframe coding significant blocks to other significant blocks is larger than the threshold value $TH_2$.

As described above, the moving picture scene detection system of FIG. 10 uses two statistical quantities, i.e., the number of the significant blocks in the frame and the ratio of the intraframe coding significant blocks to other significant blocks. Because of this, the scene change detection by the moving picture scene detection system is reliable.

Next, still another embodiment of the moving picture scene detection system according to the present invention will be described with reference to FIG. 11. In the figure, like or equivalent portions are designated by like reference numerals in FIG. 10. This embodiment uses three statistical quantities, the number of the significant blocks in the frame and the ratio of the intraframe coding significant blocks to other significant blocks, and a code quantity of the frame. Here, the code quantity of the frame means the total code quantities of the blocks of one frame that are output from the variable length coding unit. The data of the code quantity may be obtained by examining the code length of one frame of the variable-length coded image.

A statistical quantity calculator 54c of the scene change detection filter 53 calculates the code quantity of one frame from the coded image data. The code quantity is compared with a threshold value $TH_3$ in a comparator 55c. If the code quantity is larger than the threshold value $TH_3$, the comparator produces an output signal $d_3$ (=1). The output signal $d_3$ of the comparator 55c, together with the output signals $d_1$ and $d_2$ of other two comparators 55a and 55b, is input to an AND gate 56. Therefore, the scene change detection result D is given by the following expression.

$$D = d_1 \cdot d_2 \cdot d_3$$

Figure 11:
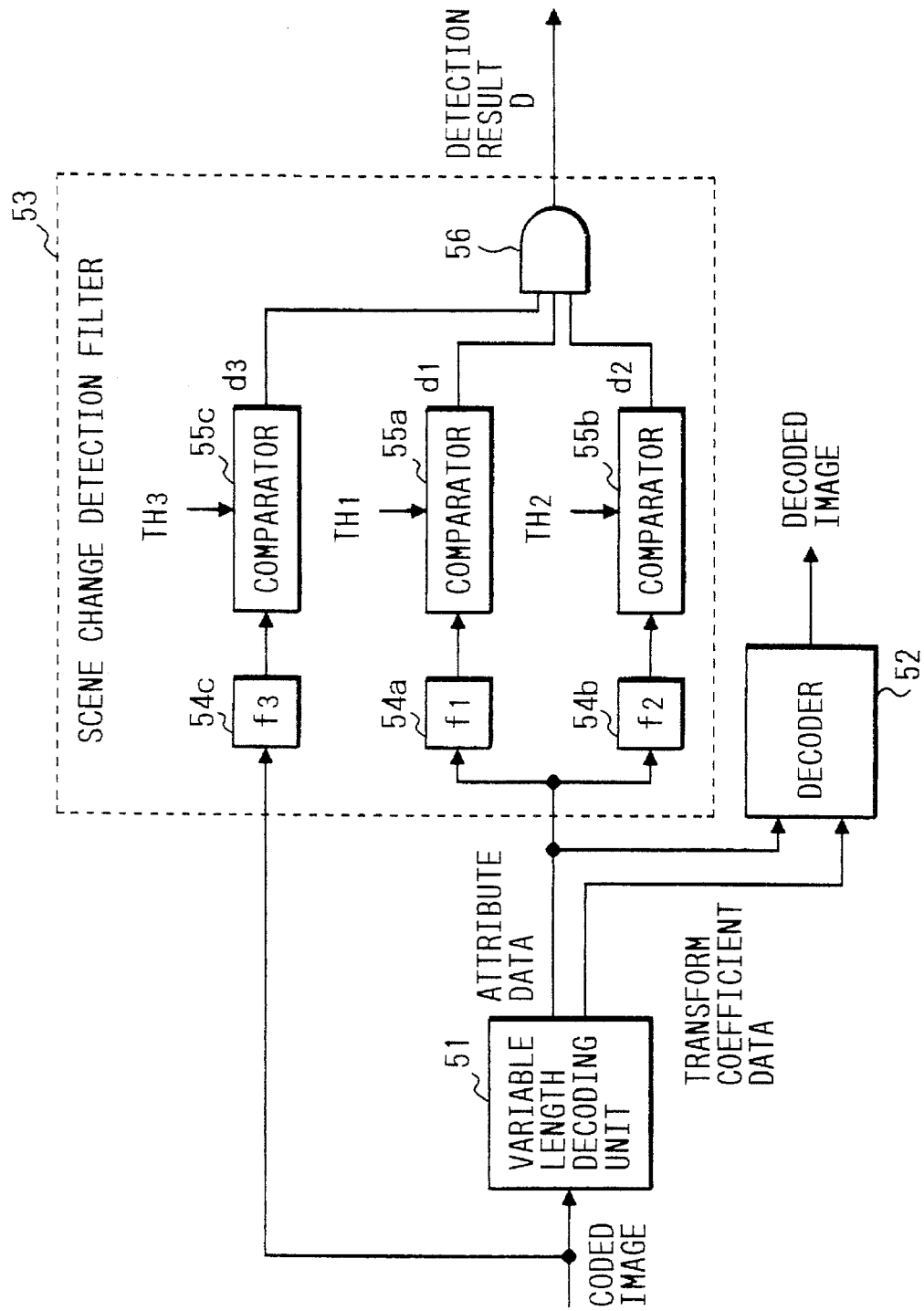
FIG. 11 is a block diagram showing still another embodiment of the moving picture scene detection system according to the present invention.

As described above, the moving picture scene detection system of FIG. 11 forms the scene change detection result on the basis of three statistical quantities, the number of the significant blocks in the frame and the ratio of the intraframe coding significant blocks to other significant blocks, and the code quantity of the frame. Accordingly, the scene change detection is more reliable.

An experiment was conducted for examining the effects of the scene change results based on the three statistical quantities. The experiment conditions used are shown in Table 1.

TABLE 1

| Item | Contents |
| --- | --- |
| Images under test | QCIF format (Y: 176 × 144, u/v: 88 × 72) 50 frames (5 scenes, one scene change per 10 frames) |
| Coding method | Interframe/intraframe adaptive coding (open loop) |
| Statistical quantities | Code quantity of the frame Number of significant blocks in the frame Radio of the intraframe coding significant blocks |

The results of the experiment are shown in FIGS. 12(a) to 12(e). The graphs of FIGS. 12(a), 12(b), 12(c), 12(d), and 12(e), respectively, show the interframe difference power of the images under test, the code quantity check result $d_3$, the check result $d_1$ of the number of significant blocks, the check result $d_2$ of the ratio of the intraframe coded significant blocks, and the detection filter output D.

In the under-test image sequence, the difference power becomes larger as the scene number increases. In order to prevent the scene change detection from being missed out, the threshold values $TH_i$ of the comparators 55a to 55c were set low. For this reason, the individual check results contain erroneous detections. However, this moving picture scene detection system eliminates the erroneous detections from the output signal of the scene change detection filter 53 by ANDing the three discrimination results.

Figure 12:
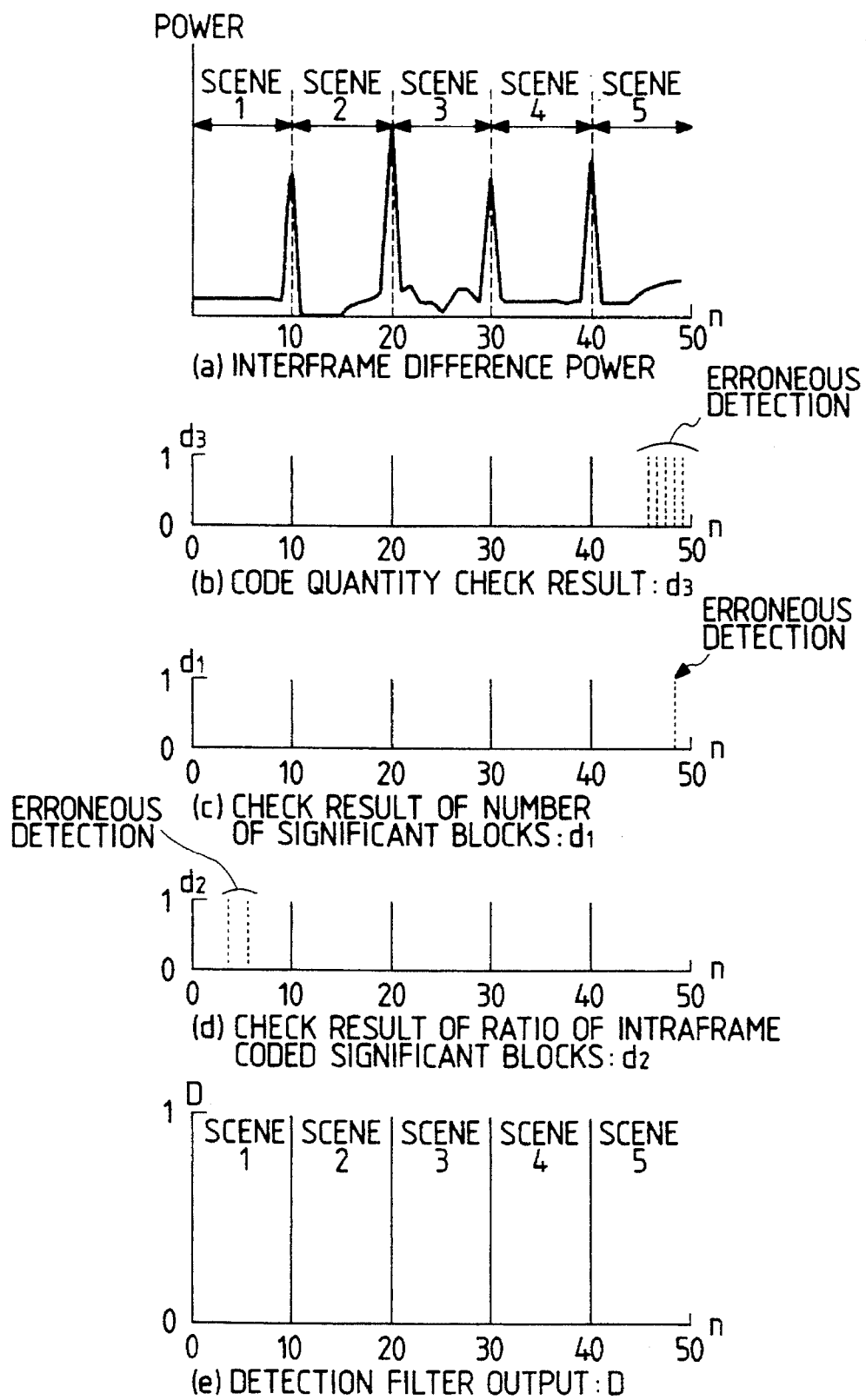
FIG. 12 is a waveform diagram showing the experimental results of a scene change detection.
Figure 13:
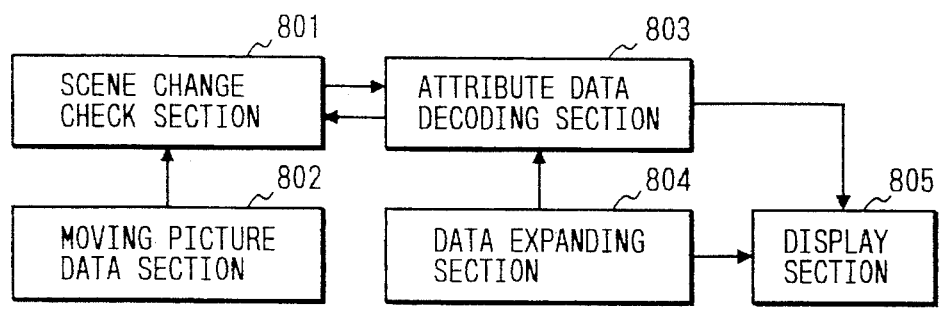
FIG. 13 is a block diagram showing the arrangement of a conventional scene detection support device.
Figure 14:
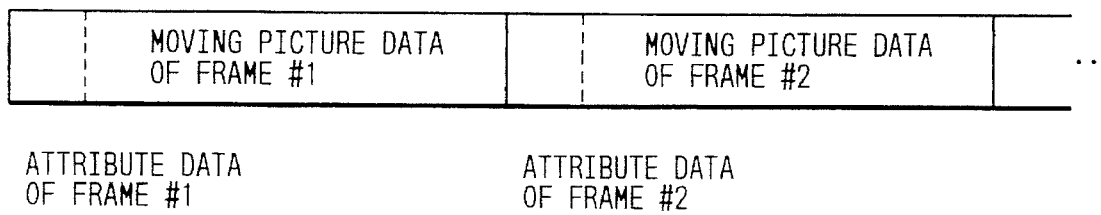
FIG. 14 is a diagram showing the format of motion picture data when it is recorded.

As seen from FIG. 12, the scene changes could accurately be detected by using the scene change detection filter, which operates based on the statistical quantities obtained from the attribute data and the code quantity of the frame.

As described above, the moving picture scene detection system of the invention can efficiently edit moving pictures without any visual inspection.

Also, in the embodiments of FIGS. 10 and 11, the results of the scene change detection, together with the coded image data, may be stored into the memory section as in the embodiment of FIG. 2.

As seen from the foregoing description, the moving picture scene detection system of the present invention can detect the scene candidates for distinctive scenes of moving pictures by decoding the attribute data of the coded moving picture data and using the decoded attribute data. Accordingly, the scene detection can be performed automatically to some extent while eliminating the human being intervention of the visual inspection. Further, there is eliminated the time consuming decoding operation to decode the whole moving picture data for scene detection.

The detected candidate scene, and several scenes preceding and succeeding to the candidate scene after decoded are displayed side by side on the screen of the display section. The user comparatively sees those scenes and discriminates the types of the candidate scenes. Accordingly, plural types of scenes can be detected. If the detection/discrimination result, that is, the types of the detected scenes and the frame positions, are stored as edit data, together with the moving picture data, the detection/discrimination result data can be used again as the edit data, when the moving pictures are edited later.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A moving picture scene detection system comprising:

data storing means for storing coded data including moving picture data, as coded image data having successive frames, and attribute data, indicative of attributes of each of the frames of the moving picture data;

attribute data decoding means for decoding the attribute data of the coded data;

candidate scene detecting means for detecting a candidate for a distinctive scene using the decoded attribute data output from said attribute data decoding means;

image data decoding means for decoding the image data of the coded data from said data storing means in response to an output of said candidate scene detection means; and image data display means for displaying the decoded image data output from said image data decoding means.

2. The moving picture scene detection system according to claim 1, further comprising:

difference means for determining a difference between attribute data of different frames;

intraframe coding means for coding the image data when the difference exceeds a threshold value in accordance with intraframe data; and interframe coding means for coding the image data when the difference is smaller than the threshold value in accordance with interframe data.

3. The moving picture scene detection system according to claim 1, further comprising coding means for coding the image data in accordance with a coding technique in which a code quantity is not controlled every frame, and said attribute data represents a code quantity of each frame.

4. The moving picture scene detection system according to claim 1, further comprising coding means for coding the image data in accordance with compensating for motion between frames, said frames having motion vectors, and said attribute data represents a number of nonzero motion vectors of each frame.

5. The moving picture scene detection system according to claim 1, further comprising coding means for coding the image data into image blocks, each image block including a preset number of pixels and representing a difference between a previous frame and a current frame, and when an interframe difference between an image block in the previous frame and a corresponding image block in the current frame is smaller than a threshold value, the corresponding image block in the current frame is determined to be an insignificant image block and is not coded, and when the interframe difference exceeds the threshold value, the corresponding image block in the current frame is determined to be a significant image block, and is coded, and said attribute data of said coded image data represents a number of the significant image blocks in the current frame.

6. The moving picture scene detection system according to claim 1, further comprising coding means for coding the image data into image blocks, each image block including a preset number of pixels and data representing a difference between a previous frame and a current frame, and when an interframe difference between an image block in the previous frame and a corresponding image block in the current frame is smaller than a first threshold value, the corresponding image block in the current frame is determined to be an insignificant image block and is not coded, when the interframe difference exceeds the first threshold value, the corresponding image block in the current frame is determined to be a significant image block and is coded, and when an interframe difference data between corresponding significant image blocks in the previous frame and the current frame is smaller than a second threshold value, an interframe predictive coding technique is used for coding the image block, and when the interframe difference data between corresponding significant image blocks exceeds the second threshold value, an intraframe coding technique is used for coding the image block, said attribute data of said coded image data represents a ratio of a number of the intraframe coded image blocks to a number of significant image blocks in the current frame.

7. The moving picture scene detection system according to claim 1, wherein said candidate scene detecting means further comprises frame comparison means for comparing two or more attribute data between different frames from the attribute data selected from a list consisting essentially of data for identifying an intraframe coding and an interframe coding, data representing a code quantity of each frame, data representing a number of nonzero motion vectors of each frame, data representing a number of significant blocks in the frame, and data representing a ratio of a number of intraframe coded image blocks to a number of significant blocks of the frame.

8. A moving picture scene detection system comprising:

data storing means for storing coded data including moving picture data, as coded image data having successive frames, attribute data, indicative of attributes of each of the frames of the moving picture data, and edit data of said coded image data;

attribute data decoding means for decoding the attribute data of the coded data;

candidate scene detecting means for detecting a candidate for a distinctive scene using the decoded attribute data output from said attribute data decoding means;

image data decoding means for decoding the image data of the coded data from said data storing means in response to an output of said candidate scene detecting means; and image data display means for displaying the decoded image data output from said image data decoding means, said edit data being the coded data of the candidate for a distinctive scene detected by said candidate scene detecting means.

9. The moving picture scene detection system according to claim 8, further comprising:

difference means for determining a difference between attribute data of different frames;

intraframe coding means for coding the image data when the difference exceeds a threshold value in accordance with intraframe data; and interframe coding means for coding the image data when the difference is smaller than the threshold value in accordance with interframe data.

10. The moving picture scene detection system according to claim 8, further comprising coding means for coding the image data in accordance with a coding technique in which a code quantity is not controlled every frame, and said attribute data represents a code quantity of each frame.

11. The moving picture scene detection system according to claim 8, further comprising coding means for coding the image data in accordance with compensating for motion between frames, said frames having motion vectors, and said attribute data represents a number of nonzero motion vectors of each frame.

12. The moving picture scene detection system according to claim 8, further comprising coding means for coding the image data into image blocks, each image block including a preset number of pixels and data representing a difference between a previous frame and a current frame, and when an interframe difference between an image block in the previous frame and a corresponding image block in the current frame is smaller than a threshold value, the corresponding image block in the current frame is determined to be an insignificant image block and is not coded, and when the interframe difference exceeds the threshold value, the corresponding image block in the current frame is determined to be a significant image block and is coded, and said attribute data of said coded image data represents a number of the significant image blocks in the current frame.

13. The moving picture scene detection system according to claim 8, further comprising coding means for coding the image data into image blocks, each image block consisting of a preset number of pixels and data representing a difference between a previous frame and a current frame, and when an interframe difference between an image block in the previous frame and a corresponding image block in the current frame is smaller than a first threshold value, the corresponding image block in the current frame is determined to be an insignificant image block and is not coded, when the interframe difference exceeds the first threshold value, the corresponding image block in the current frame is determined to be a significant image block and is coded, and when an interframe difference data between corresponding significant image blocks in the previous frame and the current frame is smaller than a second threshold value, an interframe predictive coding technique is used for coding the image block, and when the interframe difference data between corresponding significant image blocks exceeds the second threshold value, an intraframe coding technique is used for coding the image block, said attribute data of said coded image data represents a ratio of a number of the intraframe coded image blocks to a number of significant image blocks in the current frame.

14. The moving picture scene detection system according to claim 8, wherein said candidate scene detecting means further comprises frame comparison means for comparing two or more attribute data between different frames from the attribute data selected from a list consisting essentially of data for identifying an intraframe coding and an interframe coding, data representing a code quantity of each frame, data representing a number of nonzero motion vectors of each frame, data representing a number of significant blocks in the frame, and data representing a ratio of a number of intraframe coded image blocks to a number of significant blocks of the frame.

\* \* \* \* \*

UNITED STATES PATENT AND TRADEMARK OFFICE
CERTIFICATE OF CORRECTION

PATENT NO. : 5,459,517
DATED : October 17, 1995
INVENTOR(S) : Setsu KUNITAKE et al It is certified that error appears in the above-indentified patent and that said Letters Patent is hereby corrected as shown below:

Claim 5, Col. 12, line 66, after "and", insert --data--.

Signed and Sealed this

Twentieth Day of August, 1996

Attest:

BRUCE LEHMAN

Attesting Officer     Commissioner of Patents and Trademarks